Dec. 5, 1933.  A. LYSHOLM  1,938,077
COOLING DEVICE FOR CLOSED ELECTRICAL MOTORS,
GENERATORS, OR THE LIKE MACHINES
Filed April 28, 1930  2 Sheets-Sheet 1
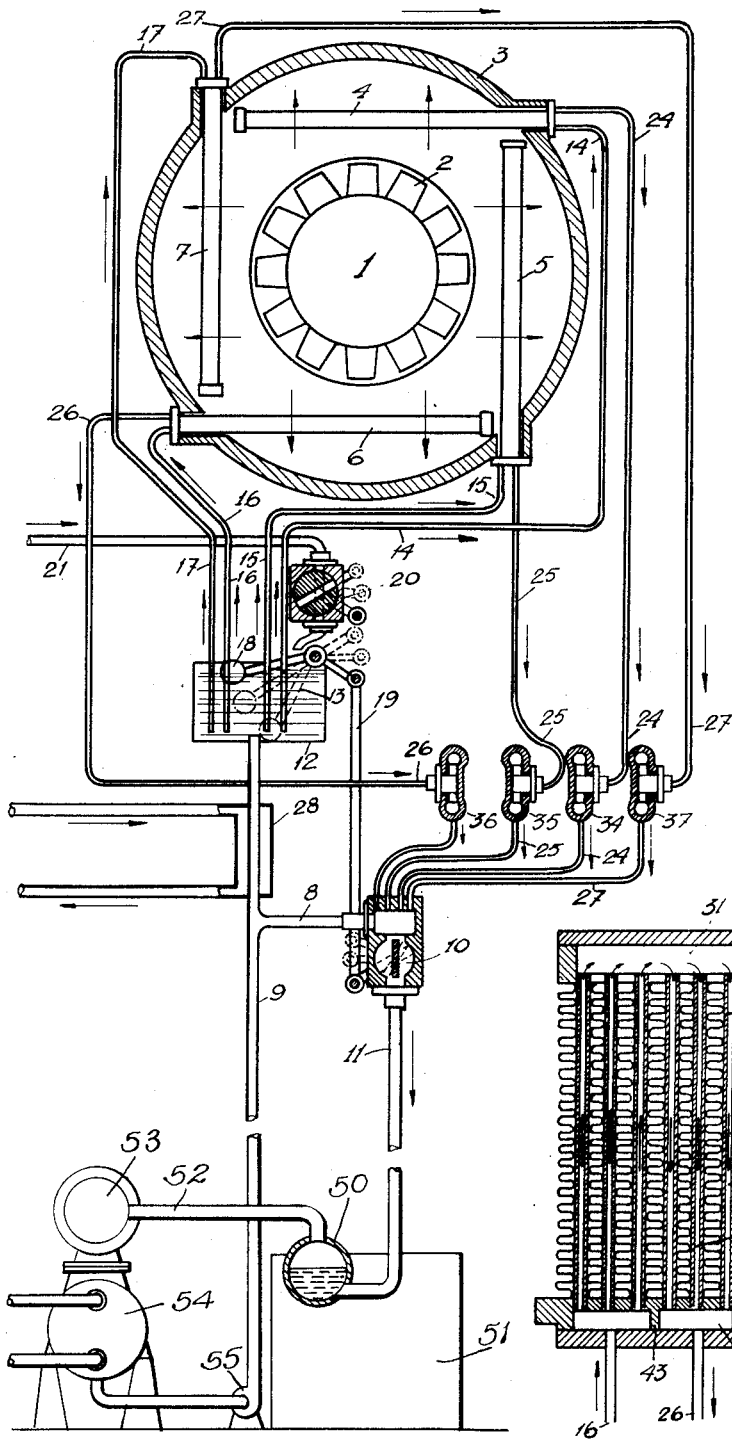

Patented Dec. 5, 1933

1,938,077

UNITED STATES PATENT OFFICE 1,938,077

COOLING DEVICE FOR CLOSED ELECTRICAL MOTORS, GENERATORS, OR THE LIKE MACHINES

Alf Lysholm, Stockholm, Sweden, assignor to Aktiebolaget Ljungströms Ångturbin, Stockholm, Sweden, a joint-stock company of Sweden Application April 28, 1930, Serial No. 448,006, and in Germany May 3, 1929

20 Claims. (Cl. 171—252)

Cooling devices for electrical machines, such as motors and generators, are already known, in which an interior air current flows first around the parts of the electrical machine to be cooled and then around elements, by means of which the air is cooled. As a cooling medium for circulation through these elements, there has been utilized an external air current, and it has also been proposed to pass water through these cooling elements. In certain forms of embodiment, this cooling device has served as a feed water heater for a steam boiler, in which case the supply part of the cooling device is directly or indirectly connected with the condenser. However, the condensate water at disposal is not always sufficient for obtaining sufficient cooling effect. It, therefore, has been proposed in such cases, for instance during the summer months and at low loads of the machines which cooperate with the condenser, to increase the condensate water by other water or to use entirely other water. In this system several disadvantages have arisen, in that contaminating particles in the additional water have corroded the interior of the cooling elements as well as the steam boiler installation. In addition, such a cooling device requires such a large space—particularly because special element groups have to be used for the reserve water—that the same could not be accommodated in a housing which can be built together with the housing surrounding the electrical machine.

The present invention relates to cooling devices of this kind and has for its object devices, by means of which the above mentioned disadvantages are eliminated.

The invention comprises the arrangement whereby the cooling elements are directly or indirectly in communication with a supply conduit and with a discharge conduit for cooling water, which conduits are directly or by means of a connecting conduit connected with each other.

Further characteristic features of the invention will be described together with the illustrations on the accompanying drawings.

Fig. 1 is a section through an electrical generator along a plane at right angles to the axis of rotation, and further a diagrammatical view of the arrangements of the cooling device;

Fig. 2 is a section through the cooling elements shown in Fig. 1, drawn on a larger scale.

Figure 3:
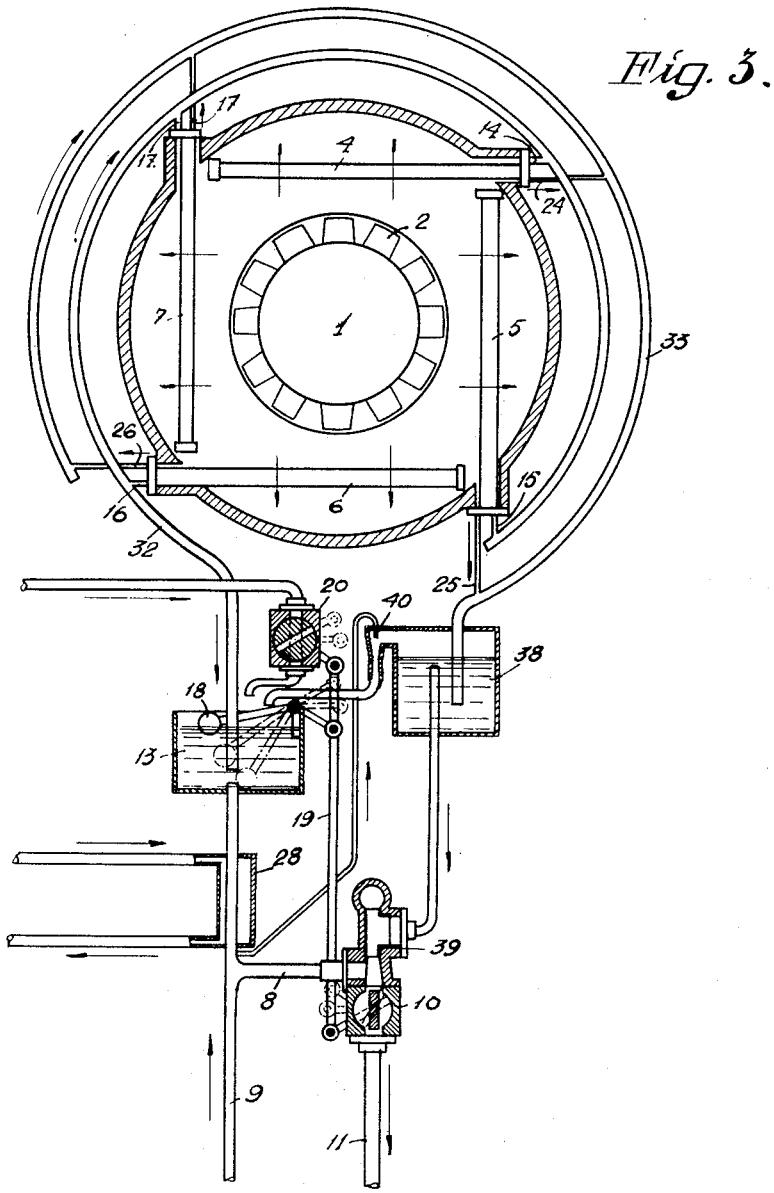
Fig. 3 shows a modification of Fig. 1.

In Fig. 1, reference character 1 designates the axis of rotation of the generator, 2 a fan which sets up a current of air in the interior of the housing 3, which circulates around the parts to be cooled and through the groups of cooling elements 4, 5, 6 and 7 situated in the same housing 3 or in a continuation thereof. The cooling element groups are located with one end on the outside of the housing 3 and are here connected with supply conduits for cooling water 14, 15, 16 and 17 and with a discharge conduit 24, 25, 26 and 27. In the discharge conduits 24, 25, 26 and 27 are arranged pumps 34, 35, 36 and 37 which suck the cooling water through the elements in the groups 4, 5, 6 and 7.

If a leak occurs in one or several of the cooling elements, the cooling water does not leak out into the electrical machine, but the pumps suck in the air, so that damage by water is avoided in the machine. The discharge conduits 24, 25, 26 and 27 are connected either through a connecting conduit 8 with the supply conduit 9 common for all elements or through a valve 10 with the conduit 11. The supply conduit 9 and the conduit 11 may be directly or indirectly in communication, the first-named with the condenser and the last-named with the steam boiler. By way of example, the cooling water flowing through conduit 11 is shown as being returned to the drum 50 of the boiler 51, which supplies steam through conduit 52 to a consumer 53. Steam discharged from consumer 53 is condensed in condenser 54 and is returned to the supply conduit 9 as by means of the usual circulating pump 55. It will be evident that the specific arrangement for utilizing the water delivered through conduit 11 and the means for returning the condensate from the condenser to the supply line 9 may be varied widely within the scope of the invention. The supply conduits 14, 15, 16 and 17 are arranged with their ends in a container or receiver 12 and open underneath the level of the water 13 contained therein. By means of the pumps 34, 35, 36 and 37 the water is drawn out of the container 12 through the groups of cooling elements 4, 5, 6 and 7. When the level of the water 13 in the container 12 falls, a float 18 also falls, whereby a rod 19 is lifted and thereby increases or opens the water supply through the conduit 8. If the water falls further in the container, which only takes place under extraordinary conditions, the rod 19 is lifted still further, whereby a cock 20 will be opened for the supply of reserve water through the conduit 21. The water level falls in the container 12 if little or no condensate is supplied through the conduit 9. The water which has passed through the cooling elements, therefore, is led back to the supply conduit, so that the water flows through a closed circuit in the system. In heat exchange relation with the part of this circuit which is situated outside of the electrical machine, there is provided a cooler 28 in which the flowing water is cooled down again. The cooling water therefore can flow independently of the conduit 11 and the condenser conduit 9 and cool the air, for which reason the cooling system may be carried out without the supply conduit 9 and the discharge conduit 11. As, however, the heat produced in the electrical machine is transferred to other cooling water in the cooler 28, the heat cannot be utilized for the steam boiler, and the cooler 28 should be used only when the condensate is not sufficient or is of such high temperature that sufficient cooling of the elements 4, 5, 6 and 7 is not obtained.

In Fig. 2 is shown one of the groups, for instance group 6 in Fig. 1, in a longitudinal section. The elements 29 are inserted with their ends into the chambers 30 and 31. The chamber 30 is divided by means of a partition 43 into two parts, one part of which is in communication with the supply conduit 16, while the other part is connected with the discharge conduit 26. The cooling water therefore flows, as indicated by the arrows, through a number of elements from the chamber 30 to the chamber 31, where it changes its direction and flows back to the chamber on the other side of the partition 43 and is led away through the discharge conduit 26. The elements consist of flattened tubes which are spaced apart by corrugated plates which, if desired, may be fastened to the flat sides of the flattened tubes. These sides may also be provided with ridges or flanges which, if desired, extend in directions crossing each other.

In Fig. 3, which illustrates a modification of Fig. 1, the same reference numerals as in Fig. 1 are used for corresponding parts. The cooling water coming from the condenser, flows first through a cooler 28 which may be situated in a branch conduit of the conduit 9 and is used only when the temperature of the water flowing through conduit 9 is not sufficiently low to produce an effective cooling. The cooling water flows through a container or receiver 12 in which a float 18 responsive to the water level opens or closes a valve 10 in the discharge conduit and the valve 20 for reserve water in the manner described in connection with Fig. 1. From this container, the water flows through a conduit 32 common for all groups 4, 5, 6 and 7, from which conduit the supply conduits 14, 15, 16 and 17 branch off. Upon the water having passed the elements, it is led away through the discharge conduits 24, 25, 26 and 27 to a common discharge conduit 33 which conducts the heated cooling water to a container or receptacle 38. This container is closed and is maintained under sub-atmospheric pressure which is produced by a pump 39 common to the whole system and which forces the water either directly or indirectly through the conduit 11 to the steam boiler, or else, if the valve 10 is closed, through the conduit 8 to the conduit 9, in order that it may flow again through the cooling elements. The boiler and condenser arrangement for utilizing water flowing through conduit 11 and returning the condensate supply through conduit 9 may be the same in the present embodiment as in that illustrated in Fig. 1. The water, therefore, will be drawn with the aid of the pump through the elements, and hence, if a leak should occur in any of the elements, air will leak in instead of water leaking out. Air thus sucked into the elements is collected in the container 38 above the water level contained therein. An ejector 40 removes this air and the ejector water is led back to the container 12. The ejector receives water under pressure, in the embodiment here described, from the conduit 9, but may receive the same from any other source, if higher pressure is required. The whole system may also work independently of the conduit 9 from the condenser and the conduit 11 to the steam boiler, the water then flowing continuously between the cooling elements 4, 5, 6 and 7 and the cooler 28. If the cooling device is not intended to use condensate water, certain of the members, such as for instance the valve 10, are of course not necessary. The size of the container is dependent of the quantity of the necessary reserve water. The container 38 is preferably totally closed, while the container 12, in which no lower pressure need exist than that of the surrounding air, may be open.

Several embodiments of this invention are conceivable, and the invention therefore is not dependent upon the construction of the air cooler as shown or dependent upon whether space can be provided for the cooler on the side of or underneath the electrical machine. Further, the details which are shown on the drawings only diagrammatically may be arranged in relation to each other in a different manner.

What I claim is:—

1. In a device of the character described, an electric machine comprising a closed casing, heat developing members within said casing, cooling means within said casing, and means for circulating air within said casing in contact with said members and with said cooling means, a steam generator, a steam condenser, means for cooling condensate from said condenser, means for supplying the cooled condensate to the cooling means within said casing and means for conveying the condensate from said cooling means to said steam generator.

2. In a device of the character described, an electric machine comprising a closed casing, heat developing members within said casing, cooling means within said casing, and means for circulating air within said casing in contact with said members and with said cooling means, a steam generator, a steam condenser, a liquid receiver, means for conveying condensate from said condenser to said receiver, means for conveying liquid from said receiver to said cooling means, a valve, means for conveying liquid from said cooling means to said valve, a conduit connecting said valve with said steam generator, a conduit connecting said valve with said receiver and a float in said receiver operatively connected to said valve for establishing communication between said cooling means and said steam generator when the liquid level in said receiver is high and between said cooling means and said receiver when said level is low.

3. In a device of the character described, an electric machine comprising a closed casing, heat developing members within said casing, cooling means within said casing, and means for circulating air within said casing in contact with said members and with said cooling means, a steam generator, a steam condenser, a liquid receiver, means for conveying condensate from said condenser to said receiver, means for conveying liquid from said receiver to said cooling means, a valve, means for conveying liquid from said cooling means to said valve, a conduit connecting said valve with said steam generator, a conduit connecting said valve with said receiver, means including a second valve for supplying additional water to said receiver and a float in said receiver operatively connected to both of said valves for establishing communication between said cooling means and said steam generator when the liquid level in said receiver is high and between said cooling means and said receiver when said level is low and for opening said second valve when said level is still lower.

4. In a device of the character described, an electric machine comprising a closed casing, heat developing members within said casing, cooling means within said casing, and means for circulating air within said casing in contact with said members and with said cooling means, a steam generator, a steam condenser, a liquid receiver, means for conveying condensate from said condenser to said receiver, means for conveying liquid from said receiver to said cooling means, a valve, means for conveying liquid from said cooling means to said valve, a conduit connecting said valve with said steam generator, a conduit connecting said valve with said receiver, means for removing heat from fluid within said last-mentioned conduit, and a float in said receiver operatively connected to said valve for establishing communication between said cooling means and said steam generator when the liquid level in said receiver is high and between said cooling means and said receiver when said level is low.

5. In a device of the character described, an electric machine comprising a closed casing, heat developing members within said casing, cooling means within said casing and means for circulating air within said casing in contact with said members and with said cooling means, a liquid receiver, a conduit for conveying cooling liquid from said receiver to said cooling means, a closed receptacle, a conduit for conveying cooling liquid from said cooling means to said receptacle, a pump for circulating said cooling liquid, said pump being connected to said receptacle so that sub-atmospheric pressure will obtain in said cooling means and in said receptacle, and an ejector for removing air from said receptacle, said ejector discharging into said receiver.

6. In a device of the character described, an electric machine comprising a closed casing, heat developing members within said casing, cooling means within said casing and means for circulating air within said casing in contact with said members and with said cooling means, a steam generator, a liquid receiver, a conduit for conducting cooling water from said receiver to said cooling means, a closed receptacle, a conduit for conducting cooling water from said cooling means to said receptacle, a conduit for conducting water from said receptacle to said steam generator, a pump for circulating cooling water through said cooling means and into said steam generator, said pump being connected in said last-mentioned conduit so that a sub-atmospheric pressure will obtain in said cooling means and in said receptacle, and means for removing air from said receptacle.

7. The method of cooling an electrical machine by the aid of fluid conveying cooling elements in heat exchange relation with air circulated in a closed path through the machine which consists in circulating condensate through the cooling elements, utilizing the condensate circulated through the cooling elements as a boiler feed water supply when the supply of condensate available is adequate for effecting cooling of the elements, recirculating condensate through the cooling elements when the condensate supply is inadequate for cooling purposes, and passing the condensate to be recirculated in heat exchange relation with a cooling fluid out of contact therewith.

8. The method of cooling an electrical machine by the aid of fluid conveying cooling elements in heat exchange relation with air circulated in a closed path through the machine which consists in maintaining a pool of condensate, drawing the condensate from said pool through said cooling elements, utilizing the condensate drawn through said elements as a boiler feed water supply when the amount of condensate available is sufficient to maintain an adequate supply to said pool, by-passing to said pool condensate drawn through said elements to compensate for deficiency in the main condensate supply to said pool, utilizing variations in the liquid level of said pool to govern the amount of condensate by-passed and passing a separate cooling fluid in heat exchange relation with the by-passed condensate to cool the same.

9. The method of cooling an electrical machine having a closed casing by the aid of fluid conveying cooling elements situated within the casing adjacent to the heat generating parts of the machine and adapted to abstract heat from air circulated through a closed path within the machine which consists in maintaining a pool of condensate, drawing condensate through said cooling elements from said pool due to suction, whereby to maintain the pressure of condensate in said cooling elements below the pressure of the surrounding atmosphere, and directing variable proportions of the condensate drawn through the cooling elements to a boiler feed line and to said pool in accordance with variations in the level of the condensate in the pool.

10. The method of cooling an electrical machine having a closed casing by the aid of fluid conveying cooling elements situated within the casing adjacent to the heat generating parts of the machine and adapted to abstract heat from air circulated through a closed path within the machine which consists in maintaining a pool of condensate, drawing condensate through said cooling elements from said pool due to suction, whereby to maintain the pressure of condensate in said cooling elements below the pressure of the surrounding atmosphere, selectively directing variable proportions of the condensate drawn through the cooling elements to a boiler feed line and to said pool in accordance with variations in the level of the condensate in the pool and cooling the portion of the condensate returned to the pool by a separate cooling fluid out of contact with the condensate.

11. Apparatus of the character described comprising an electrical machine having a closed casing, heat developing members within said casing, fluid conveying cooling elements located in said casing and adapted to cool air heated by said heat developing members and circulated in a closed path within the casing, means for supplying condensate to said elements as a cooling medium therefor, means for withdrawing heated condensate from said elements, means for returning a portion of the heated condensate to said first means, and means for cooling the condensate returned to said cooling elements comprising a surface type heat exchanger located outside said casing.

12. Apparatus of the character described comprising an electrical machine having a closed casing, heat developing members within said casing, fluid conveying cooling elements within the casing arranged to abstract heat from air heated by said heat developing members and circulated in a closed path within the casing, a liquid receiver, a conduit for conveying condensate from a condenser to said receiver, means for conducting condensate from said receiver to said cooling elements, means for conducting condensate from said cooling elements, a connection for returning condensate from said last named means to said receiver, means responsive to variations in the level of condensate in said receiver for governing the quantity of condensate returned thereto and means for cooling the condensate returned to said receiver comprising a surface type heat exchanger located outside of said casing.

13. Apparatus of the character described comprising an electrical machine having a closed casing, heat developing members within said casing, fluid conveying cooling elements within the casing arranged to abstract heat from air heated by said heat developing members and circulated in a closed path within the casing, a liquid receiver, a conduit for conveying condensate from a condenser to said receiver, means for conducting condensate from said receiver to said cooling elements, means including a pumping device for drawing condensate through said elements, means for conducting condensate discharged from said pumping device to the feed water supply for a boiler, means for automatically by-passing a portion of the condensate from said last mentioned means to said receiver when the amount of condensate supplied to the receiver from the condenser is inadequate, and means for cooling the condensate by-passed to the receiver comprising a surface type heat exchanger located outside said casing.

14. Apparatus of the character described comprising an electrical machine having a closed casing, heat developing members within said casing, fluid conveying cooling elements within the casing arranged to abstract heat from air heated by said heat developing members and circulated in a closed path within the casing, a liquid receiver, a conduit for conveying condensate from a condenser to said receiver, means for conducting condensate from said receiver to said cooling elements, means including a pumping device for drawing condensate through said elements, means for conducting condensate discharged from said pumping device to the feed water supply for a boiler, means for by-passing condensate from said last mentioned means to said receiver in response to lowering of the level of condensate in the receiver, means for cooling the condensate by-passed to the receiver comprising a surface type heat exchanger located outside said casing, and means responsive to lowering of the level of condensate in said receiver for supplying make-up liquid thereto.

15. Apparatus of the character described comprising an electrical machine having a closed casing, heat developing members in said casing, a plurality of fluid conveying cooling elements within said casing and arranged to cool air heated by said heat developing members and circulated in a closed path within said casing, a condensate receiver, means for conducting condensate to said receiver, a plurality of conduits for conducting condensate from said receiver to said cooling elements, a plurality of conduits for conducting condensate from said cooling elements, pumping means connected to said last mentioned conduits for drawing condensate through said cooling elements, said conduits being arranged for parallel flow of condensate through said cooling elements, a conduit adapted to conduct condensate from said pumping means to the feed water supply for a boiler, a by-pass conduit for returning condensate from said last mentioned conduit to said receiver, means responsive to the quantity of condensate in said receiver for governing the quantity of condensate returned through said by-pass conduit, and means for cooling the condensate returned to said receiver comprising a surface type exchanger located outside said casing.

16. Apparatus of the character described comprising an electrical machine having a closed casing, heat developing members in said casing, a plurality of cooling elements distributed within said casing around the axis of rotation of the machine, said cooling elements being adapted to abstract heat from air heated by said heat developing members and circulated in a closed path within the casing, means for supplying condensate to said cooling elements, means for conducting condensate from said cooling elements, means for causing recirculation of condensate through said cooling elements when the condensate supply is insufficient, and means for cooling the condensate to be recirculated comprising a surface type heat exchanger located outside said casing.

17. Apparatus of the character described comprising an electrical machine having a closed casing, heat developing members in said casing, a plurality of cooling elements distributed within said casing around the axis of rotation of the machine and adjacent to said heat developing members, said cooling elements being adapted to abstract heat from air heated by said heat developing members and circulated in a closed path within the casing, means for supplying condensate to said cooling elements, means for conducting condensate from said cooling elements, means for causing recirculation of condensate through said cooling elements when the condensate supply is insufficient, and means for cooling the condensate to be recirculated comprising a surface type heat exchanger located outside said casing.

18. Apparatus of the character described comprising an electrical machine having a closed casing, heat developing members in said casing, a plurality of cooling elements distributed within said casing around the axis of rotation of the machine and adjacent to said heat developing members, said cooling elements being adapted to abstract heat from air heated by said heat developing members and circulated in a closed path within the casing, means for supplying condensate to said cooling elements, means for conducting condensate from said cooling elements, means responsive to variations in the rate of supply of condensate for causing recirculation of condensate through said cooling elements, and means for cooling the condensate to be recirculated.

19. Apparatus of the character described comprising an electrical machine having a closed casing, heat developing members in said casing, a plurality of fluid conveying cooling elements within said casing and arranged to cool air heated by said heat developing members and circulated in a closed path within said casing, a condensate receiver, a conduit for conducting condensate from said receiver to said cooling elements, a closed receptacle, a conduit for conducting condensate from said cooling elements to said receptacle, a pump for withdrawing condensate from said receptacle, and means for removing air from said receptacle, said pump and said means operating to maintain pressure in said receptacle below atmospheric pressure to draw said condensate through said cooling elements.

20. Apparatus of the character described comprising an electrical machine having a closed casing, heat developing members in said casing, a plurality of fluid conveying cooling elements within said casing and arranged to cool air heated by said heat developing members and circulated in a closed path within said casing, a condensate receiver, a conduit for conducting condensate from said receiver to said cooling elements, a closed receptacle, a conduit for conducting condensate from said cooling elements to said receptacle, a pump for withdrawing condensate from said receptacle, and an ejector actuated by flow of condensate supplied to said cooling elements for removing air from said receptacle, said pump and said ejector operating to maintain pressure in said receptacle below atmospheric pressure to draw said condensate through said cooling elements.

ALF LYSHOLM.